United States Patent
Yamashita et al.

(10) Patent No.: US 6,233,224 B1
(45) Date of Patent: May 15, 2001

(54) COMMUNICATION METHOD AND DATA COMMUNICATIONS TERMINAL, WITH DATA COMMUNICATION PROTOCOL FOR INTER-LAYER FLOW CONTROL

(75) Inventors: Kei Yamashita; Hiroyuki Tanaka; Shusuke Utsumi; Atsushi Shionozaki, all of Tokyo (JP)

(73) Assignees: Sony Computer Laboratory, Inc.; Sony Corporation; Nippon Telegraph and Telephone Corporation, all of Tokyo (JP)

(*) Notice: Subject to any disclaimer, the term of this patent is extended or adjusted under 35 U.S.C. 154(b) by 0 days.

(21) Appl. No.: 09/160,234

(22) Filed: Sep. 24, 1998

(Under 37 CFR 1.47)

(30) Foreign Application Priority Data

Sep. 25, 1997 (JP) .................................................. 9-259474

(51) Int. Cl.[7] .................................................. G01R 31/08
(52) U.S. Cl. .................... 370/231; 370/236; 370/401; 370/410; 370/445; 370/469; 370/471
(58) Field of Search .................... 370/471, 445, 370/410, 401, 389, 230, 241, 252, 231, 235, 236, 469; 709/250, 229

(56) References Cited

U.S. PATENT DOCUMENTS

| 5,313,454 | * | 5/1994 | Bustini et al. | 370/13 |
| 5,361,372 | | 11/1994 | Rege et al. | 709/234 |
| 6,018,530 | * | 1/2000 | Chakravorty | 370/471 |
| 6,034,963 | * | 3/2000 | Minami et al. | 370/401 |
| 6,046,980 | * | 4/2000 | Packer | 370/230 |
| 6,081,524 | * | 6/2000 | Chase et al. | 370/389 |

FOREIGN PATENT DOCUMENTS 0 219 049 A2    4/1987 (EP) .

* cited by examiner

Primary Examiner—Dang Ton
Assistant Examiner—Anthony Ton
(74) Attorney, Agent, or Firm—J. William Wigert, Jr.; Crosby, Heafey, Roach & May

(57) ABSTRACT

A data communication protocol is implemented to control data flow between a transport layer and a data link layer. The protocol provides two manners of data flow control. (1) In the first control manner, when the occupancy of packet buffers of the data link layer is smaller than a first threshold, the data link layer informs of the transport layer that the packet transport should be suspended, and thereafter when the occupancy is smaller than a second threshold smaller than the first one, the data link layer requests the transport layer to resume the packet transfer. (2) In the second control manner, when the amount of packets is smaller than a value determined based on the transfer rate and maximum burst size, the transport layer transfers a packet to a lower layer, and when the packet amount is larger than the value, a packet is transferred after a predetermined time passes to control the transfer rate to a predetermined one.

3 Claims, 4 Drawing Sheets

COMMUNICATION METHOD AND DATA COMMUNICATIONS TERMINAL, WITH DATA COMMUNICATION PROTOCOL FOR INTER-LAYER FLOW CONTROL

BACKGROUND OF THE INVENTION

1. Field of the Invention

The present invention relates to a communication method with a data communication protocol for packet transfer between a transport layer and a data link layer, and a data communications terminal using the data communication protocol for data communication.

2. Description of Related Art

The data communication protocol being the interfacing condition for data communications, typically the TCP/IP (Transmission Control Protocol/Internet Protocol) and OSI (Open Systems Interconnection) protocols, has a hierarchical structure as shown in FIG. 1. As shown, the hierarchical structure consists, at the level of operations executable by application programs, of an application layer 16 containing characteristics of data communications terminals, coding control function, etc., presentation layer 15 containing communication-oriented profiles, document-oriented profiles, etc., session layer 14 having a control function for data transmission and reception IDs, etc., transport layer 13 for carrying out a transport procedure independent of any network because the transport layer 13 is an upper layer, network layer 12 for control of call setting, disconnection, etc. for each network, data link layer 11 for establishing, releasing, error control, etc. of a data link, and a physical layer 10 for setting a user and network voltage physical interface conditions.

For packet transmission, a packet generated by a software of the application layer 16 (also including the presentation layer 15 and session 14) is transferred to a software which implements the transport layer 13, and then sequentially from the transport layer 13 to the network layer 12, from the network layer 12 to the data link layer 11, and further to a lower layer. Finally, the packet is represented in the form of an electric or light pulse for transmission from a data communications terminal.

In the conventional packaged data communications terminal, the packet is copied from a memory only twice. That is, the memory copying is done when the packet is moved from the application layer 16 to the transport layer 13 in a main memory 1 and when the packet is moved from the main memory 1 of the data communications terminal to a packet buffer 3 in a network interface module 2 via a bus 5, as shown in FIG. 2. The packet is moved between other layers higher than the data link layer 11 just by passing a pointer to a location in the main memory 1 where the packet is stored.

In the memory copying from the application layer 16 to the transport layer 13, a flow control is made to avoid any data loss due to a packet buffer overflow in the transport layer 13. Namely, when the packet buffer in the transport layer 13 is about to overflow, such a control will be done that the application layer 16 suspends packet copying. However, data flow between the data link layer 11 and a higher layer will not be controlled. The packet buffers of the data link layer 11 include one in the network interface module 2 and one in the main memory 1. Since no flow control is done, however, even if both the buffers overflow, the higher layer will continuously transfer packets to the data link layer 11 with the result that the packets will be discarded.

The reason for the above lies in the basic design policy that the conventional data communications protocol that the reliability of data communications is not assured for the layers lower than the transport layer 13 and the interaction between the layers is minimized.

The reliability of the data communications is assured only by packet retransmission from the transport layer 13. Therefore, even if there is no space for packets in the packet buffers of the data link layer 11, the protocol in the transport layer 13 does not suspend the packet transmission, thus the packets are lost and thereafter packets are retransmitted.

Conventionally, however, a packet is generated in the application layer 16, and transferred to the data link layer 11 via the transport layer 13 and network layer 12 at a lower rate than the rate of packet transmission from the network interface module 2 to outside the terminal, so that there occurs little packet loss due to overflow of the packet buffer in the data link layer 11.

The conventional data communication protocol is likely to be much deteriorated in throughput of data communications as the terminal performance and network function have become higher. More particularly, since the performance of the terminal components such as CPU, etc. has rapidly become improved, the rate of packet transfer to the data link 11 from a higher layer is higher than that of the packet transmission from the network interface module 2 to outside the terminal in some cases. In such a case, there is a possibility that the packet buffers of the data link layer 11 overflow, resulting in a packet loss even in the terminal.

Also, the data link layer 11 has functionally been improved to freely change the packet transmission rate as in the ATM (asynchronous transmission mode). In this case, there is a possibility that the rate of packet transmission from the data link layer 11 to outside the terminal is controlled to a low one depending upon how much congested the network is. As the packet transmission rate is thus low, the difference between the low rate of packet transmission from the data link layer 11 to outside the terminal and the rate of packet transfer to the data link layer 11 from a higher layer is larger, the possibility of the packet loss will be larger.

When a packet is lost, the transport layer 13 has to retransmit a packet, so that the data transmission throughput will be lower and the bandwidth of the network be wasted. Particularly in a transport protocol for congestion control such as TCP, when a packet loss is detected, the packet transmission rate is autonomously controlled to a low one by reducing the transmission window size or the like, the data transmission throughput will be remarkably low.

FIG. 3 shows the characteristic curve showing TCP throughput vs. maximum transmission window size.

The round trip time (RTT) between a transmitting terminal and a receiving terminal is 20 ms. With a large RTT, the transmission window size has to be increased in order to provide a higher data transmission throughput by TCP. The transmission window size referred to herein means a maximum data length that can be batch-transmitted with response of no reception acknowledgment. If the transmission window size is increased excessively, the packet buffers of the data link layer 11 overflow, resulting in a packet loss. This is caused by the fact that a higher layer will batch-transfer data in an amount for the transmission window size to the data link layer 11. If a packet is lost, the availability control of TCP is put into action to largely lower the data transmission throughput. The conventional data communication protocol is disadvantageous in that the to-be-avoided packet loss inside the terminal lowers the data transmission throughput and network availability.

SUMMARY OF THE INVENTION

Accordingly, the present invention has an object to overcome the above-mentioned drawbacks of the prior art by providing a communication method and data communications terminal in which a packet transferred between a transport layer and a data link layer is not discarded and thus a packet is lost inside the terminal, thereby preventing the data transmission throughout and network availability from being lower.

The above object can be accomplished by providing a communication method in which data flow between a transport layer and a data link layer is controlled. That is, a packet transfer from the transport layer is controlled to prevent packet buffers of the data link layer from overflowing by any of the following two methods:

In the first method of flow control, when the packet buffers of the data link layer are so highly occupied that the buffers are likely to overflow, it is informed to the transport layer that the data link layer should suspend the packet transfer. In the second manner, a packet transmission rate of the data link layer is informed to the transport layer which in turn will transfer the packet to a lower layer at a rate lower than the informed one.

According to the present invention, since the flow control is done between the transport and data link layers, no packet loss takes place inside the terminal and the data transmission throughput and network availability can be prevented from being lower.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figures 1, 3:
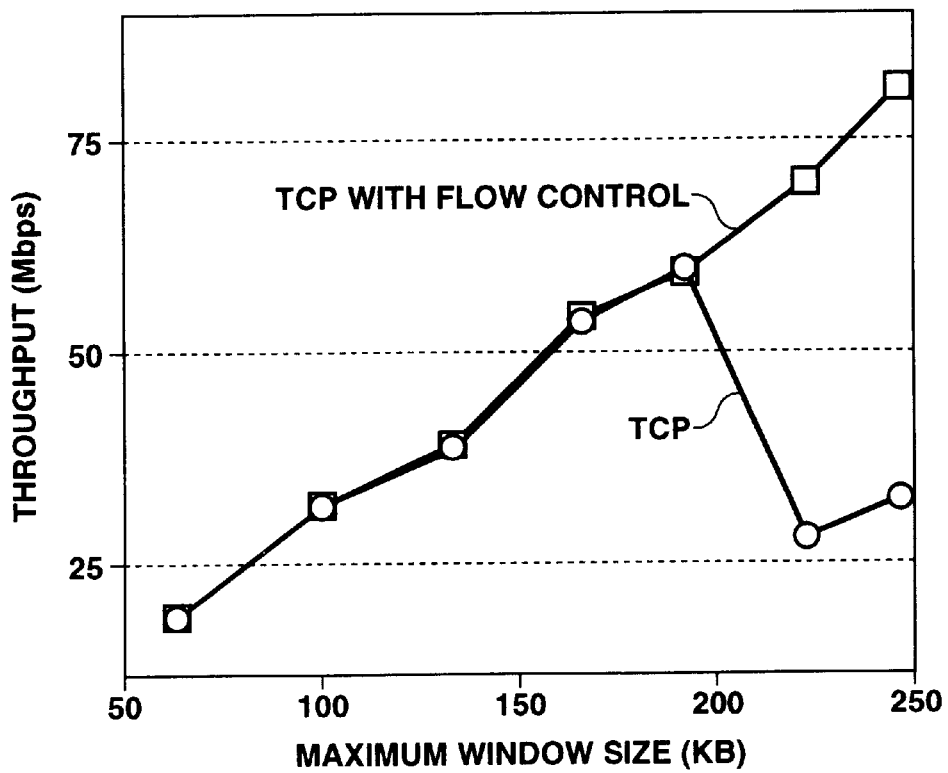
FIG. 1 shows a hierarchical structure of the data communication protocol.
FIG. 3 is a characteristic curve of the data transmission throughput attainable by the present invention and that by the conventional TCP.
Figure 2:
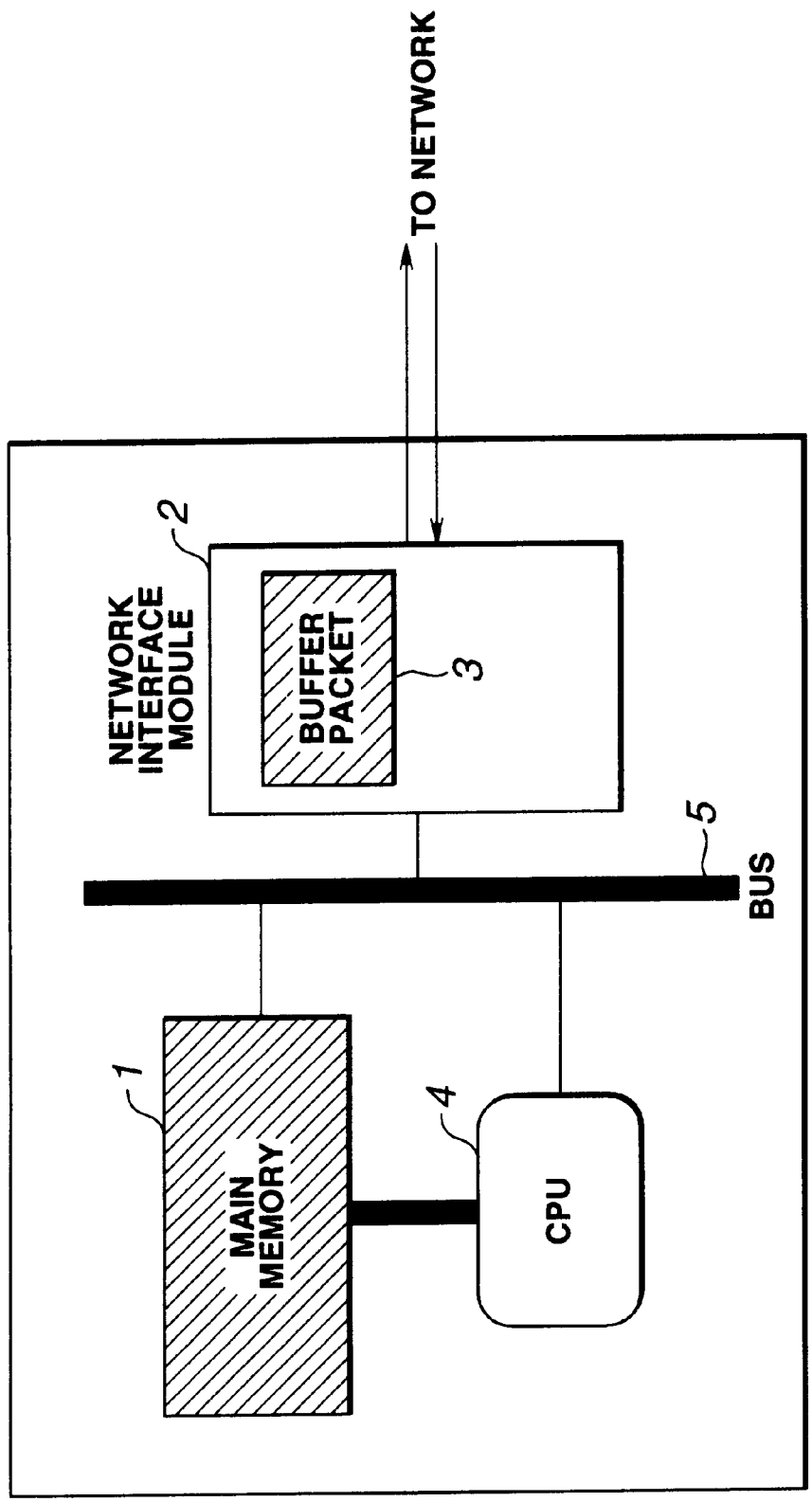
FIG. 2 shows a configuration of the data communications terminal according to the present invention.

FIG. 2 shows the configuration of the data communications terminal according to the present invention, and FIG. 3 shows the data transmission throughput attainable when the flow control according to the present invention is adopted.

As seen from FIG. 2, a communication protocol is implemented by a software and executed by a central processing unit (CPU) 4. A packet to be transmitted is generated in a main memory 1 by an application layer. The packet is moved into a bucket buffer 3 in a network interface module 2 by a software which implements a data link layer. The packet is transmitted to outside from the terminal by the network interface module 2.

FIG. 3 shows a TCP with flow control according to the present invention and a conventional TCP for comparison in data transmission throughput with each other. In the TCP window size control, data transmission and reception are controlled depending upon a number of packets (window size) continuously receivable correspondingly to the size of the buffer in a receiving terminal. In the conventional TCP, when the maximum window size exceeds about 170 kB, the data transmission throughput is lower. On the contrary, the TCP with flow control according to the present invention permits to increase the data transmission throughput with no lowering thereof In the TCP with flow control, a function to keep the rate of data transfer from the transport layer at a designated one is added to a conventional TCP. The designated rate is generally same as a actual data transmission throughput as graphically shown in FIG. 3. Different from the conventional TCP, the TCP with flow control according to the present invention is such that even if the transmission window size is large, the data transmission throughput will not be lower, as seen from FIG. 3. This is because no packet will be lost.

First embodiment:

FIG. 4 is a functional flow chart of the flow control according to the second embodiment of the present invention.

The first embodiment adopts the first flow control method in which when the packet buffers of the data link layer are so highly occupied that a bucket packet is likely to overflow, it is informed to the transport layer that the data link layer should suspend the packet transfer.

In this first method of flow control, the main memory 1 has prepared therein a variable indicative of a probability of packet buffer overflow (will be referred to as "buffer overflow flag" hereinafter) which can be accessed from both the software implementing the data link layer (will be referred to as "data link layer program" hereinafter) and the software implementing the transport layer (will be referred to as "transport layer program" hereinafter).

Figure 4B:
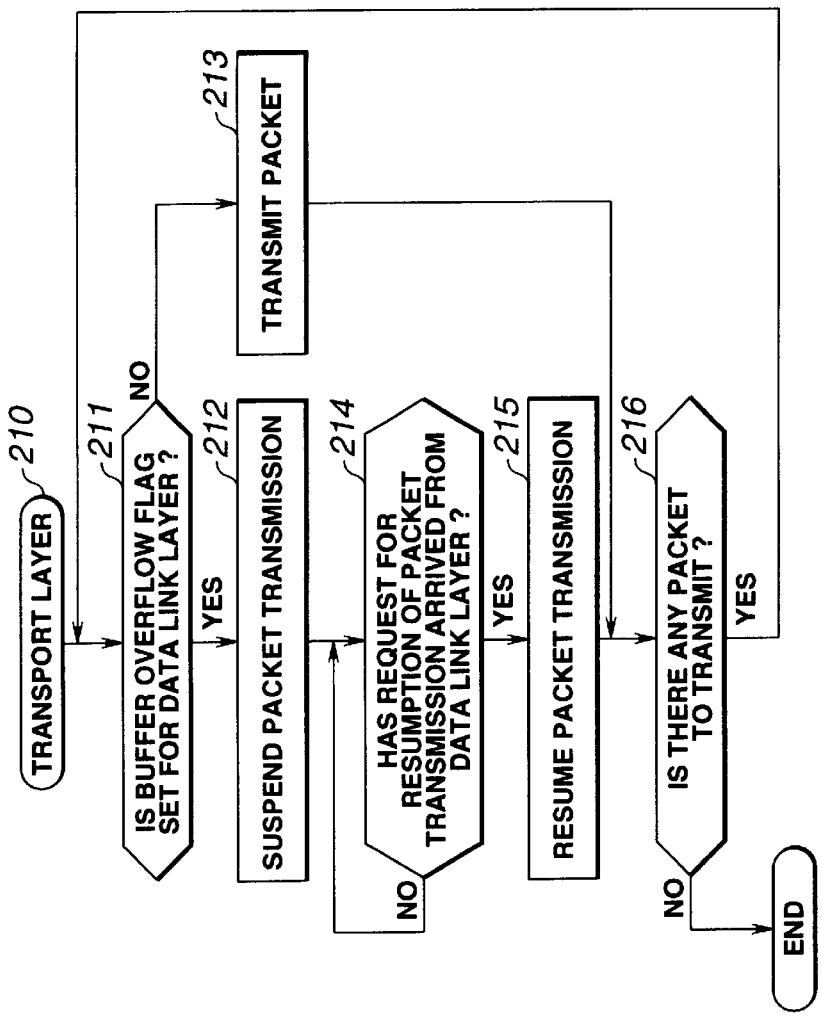
FIG. 4 is a functional flow chart of the flow control according to a first embodiment of the present invention.
Figure 4A:
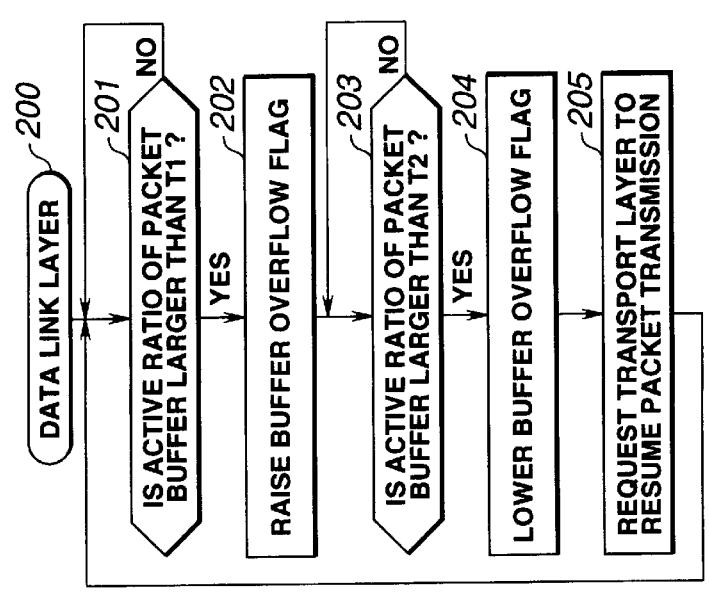

FIG. 4A shows the operations of the data link layer program, and FIG. 4B shows the operations of the transport layer program. When the occupancy or activity ratio of the bucket buffers of the data link layer is below a threshold T1, the data link layer program will set or raise a buffer overflow flag (at Steps 201 and 202). On the other hand, the transport layer program checks the buffer overflow flag before transferring a packet to a lower layer (at Step 211) to discriminate whether or not the flag is set and suspend the packet transmission if the flag is set (at Step 212). Thereafter, when the occupancy of the packet buffers of the data link layer is below a threshold T2, the data link layer program lowers the buffer overflow flag (at Steps 203 and 204), revokes and requests the transport layer program to resume the packet transmission (at Step 205). It should be noted that the thresholds T1 and T2 are a value (T1>T2) depending upon the characteristic of the network interface module 2. When knowing the arrival from the data link layer of the request to resume the packet transmission (at Step 214), the transport layer program will resume the packet transmission (at Step 215). Then, the transport layer will transmit packets (at Steps 211 and 213) while making sure that no buffer overflow flag is set for the data link layer, until there exists no further packet to be transmitted (at Step 216).

Second embodiment:

The second embodiment of the present invention employs the second method of flow control in which a packet transmission rate of the data link layer is informed to the transport layer which in turn will transfer the packet to a lower layer at a rate lower than the informed one.

In this second method of flow control, when a data transmission is started, the data link layer program will first inform the transport layer program of a rate of data transmission from the data link layer. Also, after the data transmission is started, each time the rate of data transmission from the data link layer changes, the data link layer program will inform the transport layer of the new data transmission rate. The transport layer program has provided therein a traffic shaping function, that is to say, a function to control the rate of data transmission to a lower layer, so that packet transfer is done at a rate lower than the data transmission rate of the data link layer.

More particularly, to control the rate of packet transfer from the transport layer to the data link layer to a predetermined value Rt lower than the rate of packet transfer from the data link layer, the transport layer transfers a packet to a lower layer at a time only when a total Psum+P of a sum Psum of data for packets having been transmitted for a period from a time t−s until t and a size P of a packet about to be transmitted is smaller than a value Rt×(t−s)+Bmax which is determined based on a packet transfer rate Rt and maximum burst size Bmax at the time t−s after the first transfer of packet. In other cases, no packet transfer is done before a time t' after the time t at which the above conditions are met, and at the time t', a packet transfer is done, thereby attaining the above object.

Figure 5:
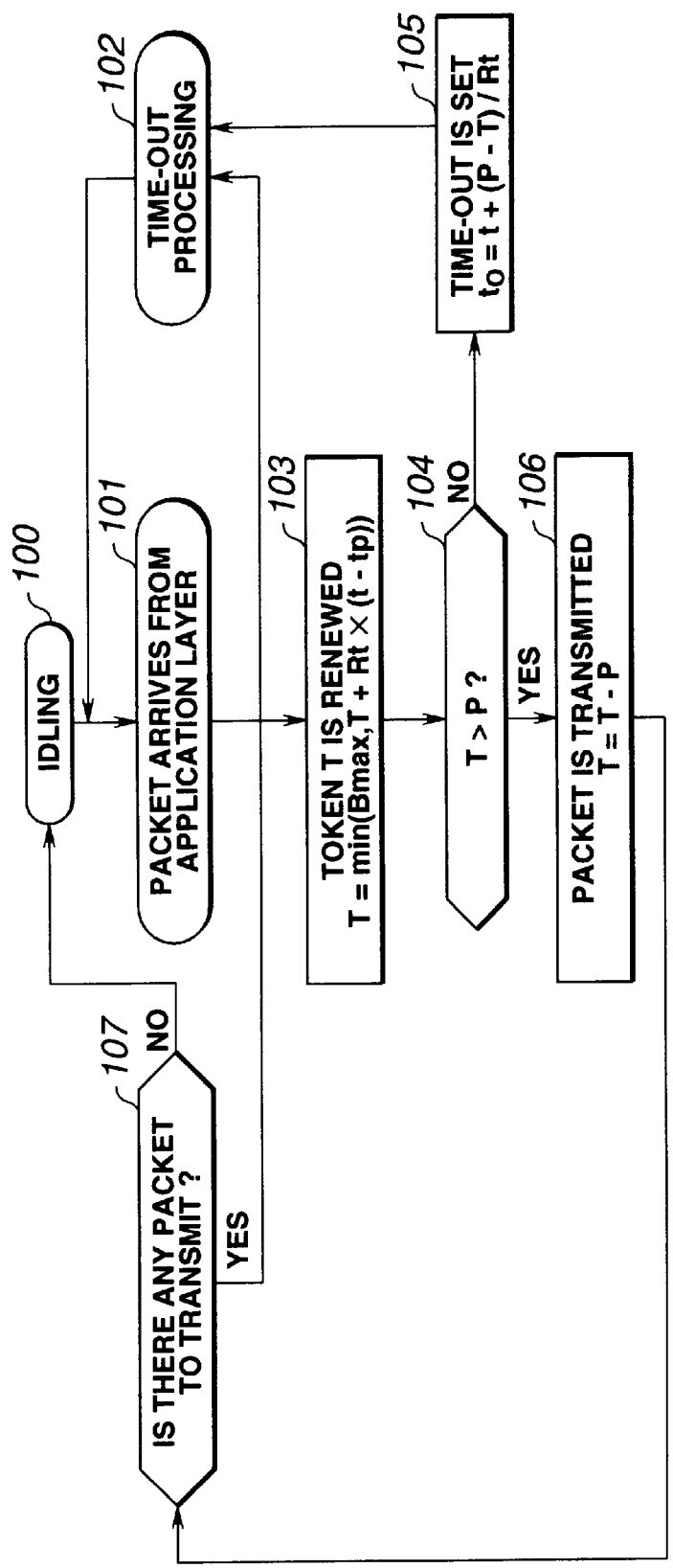
FIG. 5 is a flow chart of a traffic shaping according to a second embodiment of the present invention.

FIG. 5 is a flow chart of a traffic shaping according to the second embodiment of the present invention.

In the embodiment shown in FIG. 5, the second method of flow control is effected for an arbitrary period $S_0$ from the packet transmission start time t−s until the current time t in the expression for determination of when packet transmission is done.

The transport layer program has two parameters: Data transfer rate Rt and maximum burst size Bmax, and a token T being a variable. The initial value of the token is equal to the maximum burst size Bmax. Conceptually, the token increases at the data transfer rate Rt as the time passes but not above the maximum burst size Bmax.

After idling (at Step 100), when a packet arrives from the application layer (at Step 101), first the token T is renewed (at Step 103). Namely, the token T is renewed to a value T=min(Bmax, T+Rt×(t−tp)) where t is the current time and tp is the preceding time of packet transmission.

Next, the packet size P is compared with the token T (at Step 104). When P<T, a packet is transmitted (at Step 106). When the packet is transmitted, the token T is decreased by the packet size P (T=T−P). After the packet transmission, it is judged whether there exists a packet to transmit (at Step 107). If there is no further packet to be transmitted, the operation returns to the idling status (at Step 100). When there remains a packet or packets to transmit, the packet transmission is processed for time-out (at Step 102).

On the other hand, if the result of comparison shows that the token T is smaller than P, no packet is transmitted. A time at which the token T is larger than P is calculated (to=t+(P−T)/Rt) where to is a time-out time to set a time length until the time-out operation (at Step 105).

When the time-out operation is done, a time-out processing starts (at Step 102), the transport layer program is revoked and the packet transfer is resumed (at Step 101).

It should be noted that the data transfer rate Rt has to be lower than the data transmission rate R1 of the data link layer that is informed from the data link layer. Also, note that the maximum burst size Bmax should be smaller than Buf×(Rmax−R1)/Rmax where Buf is a packet buffer size in the data link layer and Rmax is a maximum rate of transfer from the transport layer to a lower layer to avoid a buffer overflow at the data link layer.

As having been described in the foregoing, the present invention provides a flow control between the transport layer and data link layer so that no packet is lost in the terminal, whereby it is possible to prevent the data transmission throughput and network availability from being lower.

What is claimed is:

1. A communication method for use with a data communication protocol, the protocol having an application layer, presentation layer, session layer, transport layer, network layer, data link layer and a physical layer, the method comprising:

controlling data flow between the transport and data link layers by informing the transport layer that the data link layer should suspend a packet transfer from the transport layer to the data link layer, via the network layer, when a bucket buffer in the data link layer is close to an overflow state, wherein the data link layer sends an instruction to suspend the packet transfer to the transport layer when an availability of the bucket buffer in the data link layer is larger than a first threshold, and the data link layer sends a request to resume the packet transfer when an availability of the packet buffer is smaller than a second threshold, the second threshold being smaller than the first threshold.

2. A communication method for use with a data communication protocol, the protocol having an application layer, presentation layer, session layer, transport layer, network layer, data link layer and a physical layer, the method comprising:

controlling data flow between the transport and data link layers by informing the transport layer of a packet transmission rate of the data link layer and transferring a packet from the transport layer at a rate lower than the informed packet transmission rate, wherein the data flow control is performed by transferring a packet from the transport layer to a lower layer only when a total value is smaller than a value, where Psum is an amount of data transmitted for a period from a time t−s until time t, P is a size of a packet about to be transmitted, Rt is a packet transfer rate, and Bmax is a maximum burst size at the time t−s after the first transfer of a packet, otherwise, if the total value is not smaller than the value, then not transferring a packet before a time t', after the time t, at which the total value is smaller than the value, in order to control the rate of packet transfer from the transport layer to the data link layer to a predetermined value Rt, wherein Rt is smaller than the rate of packet transfer from the data link layer.

3. A data communications terminal having a central processing unit, a main memory, and a network interface module connected via a bus between the central processing unit and the main memory, wherein the methods set forth in either claim 1 or claim 2 are executed by the central processing unit.

* * * * *